(No Model.)
I. J. BAXTER, Jr.
PERCH FOR FOWLS.
No. 342,894.　　　　　　　　　　Patented June 1, 1886.
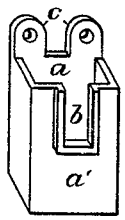
Fig. 1
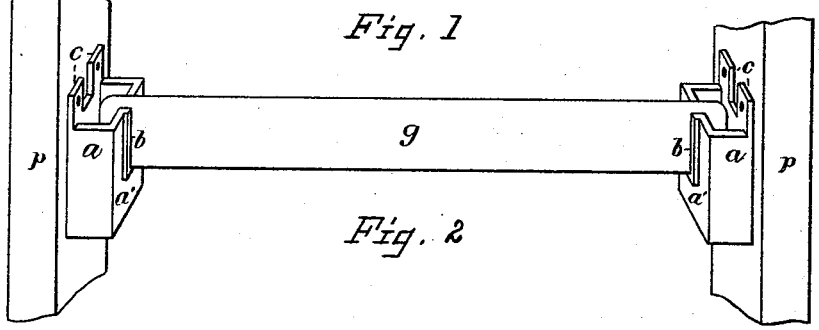
Fig. 2
Fig. 3
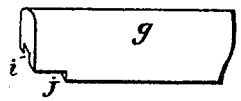  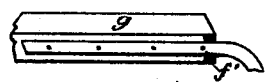
Fig. 4　　Fig. 5　　Fig. 6
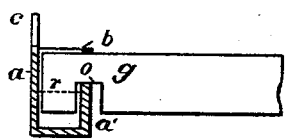 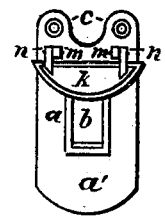
Fig. 7　　Fig. 8
Witnesses:
Allen Barger
A. Anderson
Inventor,
Isaac Jay Baxter, Jr.
By Homer Anderson
his Atty

UNITED STATES PATENT OFFICE.

ISAAC J. BAXTER, JR., OF PEEKSKILL, NEW YORK.

PERCH FOR FOWLS.

SPECIFICATION forming part of Letters Patent No. 342,894, dated June 1, 1886.

Application filed March 22, 1886. Serial No. 196,109. (No model.)

*To all whom it may concern:*

Be it known that I, ISAAC JAY BAXTER, Jr., a citizen of the United States, residing at Peekskill, in the county of Westchester and State of New York, have invented a new and useful Improvement in Perches for Fowls, of which the following is a specification.

There is a species of vermin that infests chickens which goes upon the bird at night and back to the perch near the morning, and they are frequently found on the perches in large numbers. Washing the perches with kerosene is one method of driving these insects from the perches, and it is to the application of this remedy in an easy, cleanly, and inoffensive manner that my invention relates. This result I attain by the means set forth in the accompanying drawings, in which similar letters refer to similar parts.

Figure 1 represents a combined perch-bracket and fluid-receptacle. Fig. 2 represents a completed perch. Figs. 3 and 5 are details showing the construction of the perch-bar. Figs. 4, 6, and 7 are modifications of details, as shown in Fig. 3. Fig. 8 is a view of a semicircular form of combined bracket and fluid-receptacle provided with a lid or cover.

The combined bracket and fluid-receptacle $a$, Fig. 1, may be made of any suitable material, but for convenience and cheapness I make it of cast-iron. It is secured to its support by means of screws in holes in the lugs $c$. The front side of the bracket is notched, as at $b$, in a suitable manner to admit of the insertion of the perch-bar $g$, as shown in Fig. 2. That part of the bracket below the notch $b$—i. e., $a'$—affords a receptacle for whatever fluid is to be used.

The completed combination is shown in Fig. 2, in which $a$ $a$ are the brackets attached to posts $p$ $p$. The perch-bar $g$, resting in notches $b$, spans the distance between the posts.

The perch $g$ may be made of any suitable shape, but that herein shown is a common form, and I construct it for my purposes as shown in Figs. 3 and 5, the latter figure showing a cross-section of the bar. In the bottom edge of the bar $g$ a groove, $i$, is plowed, and in this groove candle-wicking is laid, the wick $f$ at the ends terminating in rolls of the same material, although the roll is not essential, provided the end of the wick is well immersed.

$h$ $h$ $h$ $h$ represent tacks holding the wick in place. Of course any material answering the purpose of the candle-wick may be substituted for it.

When the bar or perch $g$ is inserted in its place, as in Fig. 2, the rolls $e$ $e$ rest in the cup part $a'$ of the brackets, and if kerosene, for instance, be poured in $a'$ it will be absorbed by the wicking throughout its length, and by contact of the wicking with the wood in the groove $i$ the wood will gradually absorb the oil until it becomes saturated. After the perches once become saturated it is only needful to keep oil in the receptacles $a'$ to insure keeping them so. It is obvious that the under side of this perch will be so thoroughly saturated with fluid that no insect to which the fluid is an enemy can find a lodgment thereon.

The perch $g$ may be of a length to just lie in the brackets $a$ with only little lateral play, as in Fig. 2; or they may be made shorter and be held in place by means of notches, as at $j$, Fig. 4.

The groove $i$ in the bar may be dispensed with and the wicking may be secured to the surface or even on the sides of the bar, or within a hole through the length of the bar, or a flat wick or other absorbent conductor may be applied, as in Fig. 6 at $f$.

By the use of porous wood for the bar, wicking of all kinds may be dispensed with, and by cutting a deep notch, $o$, in the bar $g$, Fig. 7, and allowing the end of the bar to rest in the oil, as shown, ($r$ representing the oil-line,) the wood may become its own conductor of the oil or other fluid.

The box part of the bracket $a$ may be provided with a cover, as $k$, Fig. 8, for the purpose of keeping out dirt and to prevent evaporation. $m$ $m$ represent lugs as a part of the bracket $a$, and $n$ $n$ are lugs attached to cover $k$. These lugs being pivoted together form a hinge for the cover. This figure represents a semicircular form of box with a cover, but otherwise corresponds to that shown in Fig. 1. It is obvious that the same end may be gained by having the perch-bracket and the fluid-receptacle separate; but for convenience and economy I consider it better to combine them.

For short perches it is not always essential to supply the fluid from both ends, a fluid-receptacle being required at one end only, and a simple bracket at the opposite end. Aside from the ready means of thus keeping the perches oiled, they are also adapted to easy and quick removal for cleaning and other purposes.

I do not wish to be confined in constructing the parts of my device to the precise forms herein shown, since the particular form of brackets and perches is not material to my invention.

Having described my invention, what I claim, and desire to secure by Letters Patent, is—

1. The combination of a perch with brackets $a$, each having a fluid-receptacle, $a'$, and notch $b$, and means, substantially as described, for securing the brackets to a support.

2. In a perch for fowls, the brackets $a$, having fluid-receptacles $a'$, each provided with notch $b$, in combination with perch $g$, having groove $i$ and wick $f$, substantially as and for the purpose described.

3. The combination of the brackets $a$, having fluid-receptables $a'$, perch $g$, and absorbent material $f$, terminating in rolls $e$, said rolls lying within the fluid-receptacles, as and for the purpose herein described.

4. The combination of bracket $a$, having a fluid-receptacle, $a'$, and notch $b$, with perch-bar $g$, having notch $o$, substantially as set forth.

5. In a perch for fowls, a perch-bar having an absorbent material throughout its length, combined with fluid-receptacles adapted to receive the ends of said absorbent material, as and for the purposes herein set forth.

ISAAC J. BAXTER, JR.

Witnesses:
GEO. S. GORDON,
JOSHUA R. PURDY.